Sept. 30, 1952 K. J. DAVIS 2,612,080
GEAR FINISHING MACHINE
Filed Sept. 3, 1946 5 Sheets-Sheet 1

INVENTOR.
KENNETH J. DAVIS
BY Whittemore, Hulbert
& Belknap
ATTORNEYS

Sept. 30, 1952  K. J. DAVIS  2,612,080
GEAR FINISHING MACHINE
Filed Sept. 3, 1946  5 Sheets-Sheet 3

INVENTOR.
KENNETH J. DAVIS
BY
Whittemore, Hulbert
& Belknap
ATTORNEYS

Sept. 30, 1952  K. J. DAVIS  2,612,080
GEAR FINISHING MACHINE
Filed Sept. 3, 1946  5 Sheets-Sheet 4

FIG. 4.

INVENTOR.
KENNETH J. DAVIS
BY
Whittemore, Hulbert
& Belknap ATTORNEYS

Sept. 30, 1952 K. J. DAVIS 2,612,080
GEAR FINISHING MACHINE
Filed Sept. 3, 1946 5 Sheets-Sheet 5

*INVENTOR.*
KENNETH J. DAVIS
BY
Whittemore, Hulbert
& Belknap ATTORNEYS

Patented Sept. 30, 1952

2,612,080

UNITED STATES PATENT OFFICE 2,612,080

GEAR FINISHING MACHINE

Kenneth J. Davis, Detroit, Mich., assignor to National Broach & Machine Company, Detroit, Mich., a corporation of Michigan Application September 3, 1946, Serial No. 694,590

10 Claims. (Cl. 90—1.6)

The present invention relates to a machine tool and more particularly to a machine tool adapted to operate upon a rotary work piece with a rotary tool.

The machine is primarily adapted to be used as a gear finishing machine of the type in which a gear and gear-like cutter are operated in mesh at limited crossed axes, in which case the gear and tool are rotated by driving either the gear or tool directly. The machine is equally well adapted to perform other operations such for example as surface shaving, in which case separate driving means for the work and rotary cutter will be employed.

It is an object of the present invention to provide a machine tool of the type described, characterized by the provision of means for adjusting the direction of relative traverse between the work piece and tool without disturbing the orientation of the work piece. It is a further object of the present invention to provide a reciprocable table in combination with means for adjusting the direction of its reciprocation without disturbing its orientation. It is a further object of the present invention to provide a machine tool characterized by the flexibility of settings and operations available thereto.

It is a feature of the present invention to provide a pair of sub-tables which are relatively reciprocable along straight ways and which are adjustable as a unit about an axis perpendicular to said ways and a table mounted on one of said sub-tables for relative reciprocation therewith and for adjustment relative thereto about an axis parallel to the first mentioned axis.

Other objects and features of the invention will become apparent as the description proceeds, especially when taken in conjunction with the accompanying drawings, wherein:

Figure 4 is a section on the line 4—4 of Figure 3; and

Figure 1:
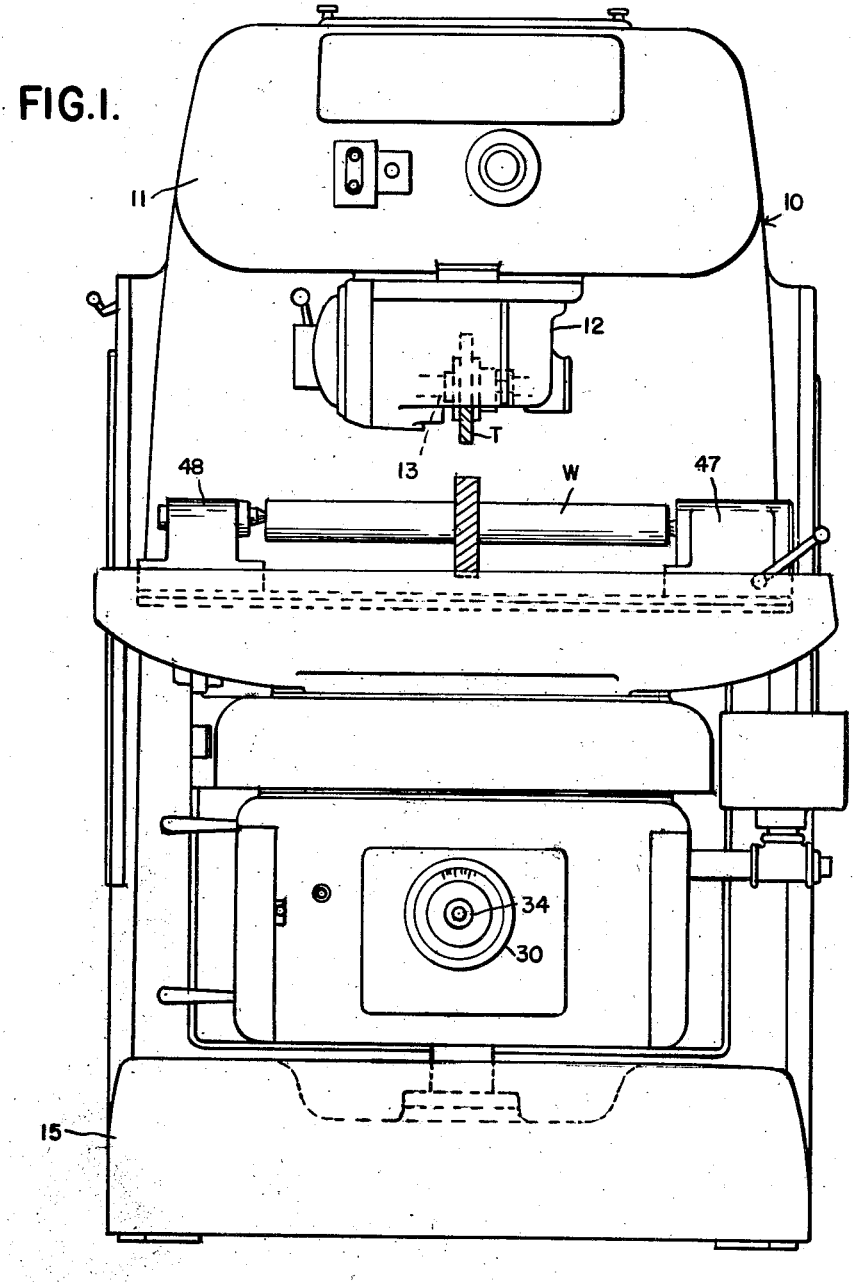
Figure 1 is a front elevation of a machine tool constructed in accordance with the present invention.
Figure 2:
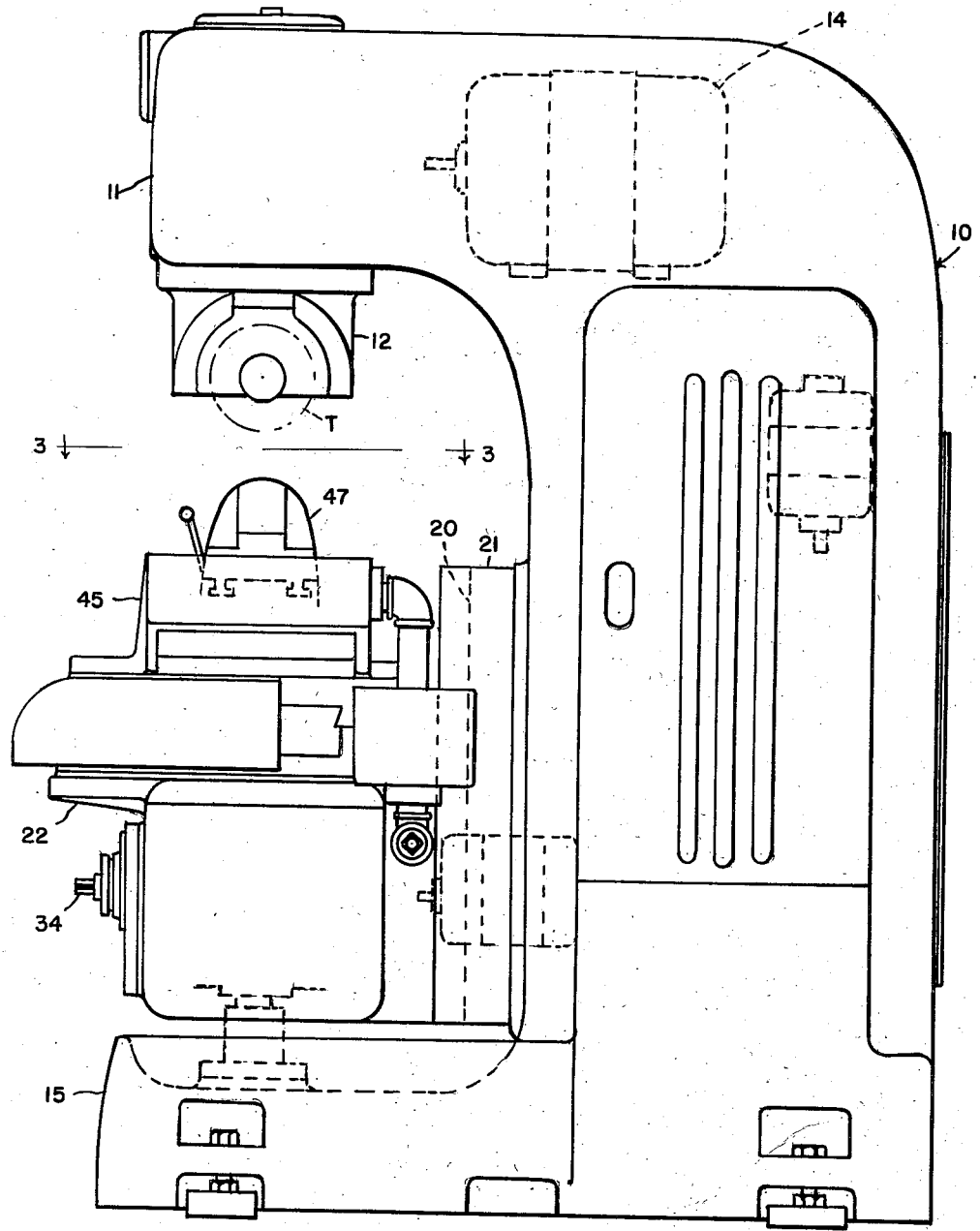
Figure 2 is a side elevation of the machine tool shown in Figure 1.

Referring first to Figures 1 and 2, the machine tool comprises a main frame 10 having an overhanging portion 11 to which is secured a tool support 12 having driving connections (not shown) for rotating the tool T supported on a rotary tool spindle 13. The tool support 12 is mounted for adjustment about a vertical axis passing through the axis of the tool spindle 13 and preferably substantially centrally of the tool T carried thereby. A tool support of this general type is disclosed in patent to Robert S. Drummond, No. 2,270,421 dated January 20, 1942, and accordingly is not described in detail here.

It will be noted, however, that independent motor means for effecting rotation of the tool spindle are provided as indicated at 14.

The base of the frame 10 extends forwardly as indicated at 15 and contains a fixed nut element (not shown) for cooperation with an adjustment screw for effecting vertical adjustment of the work support, as will presently be described.

Figure 5:
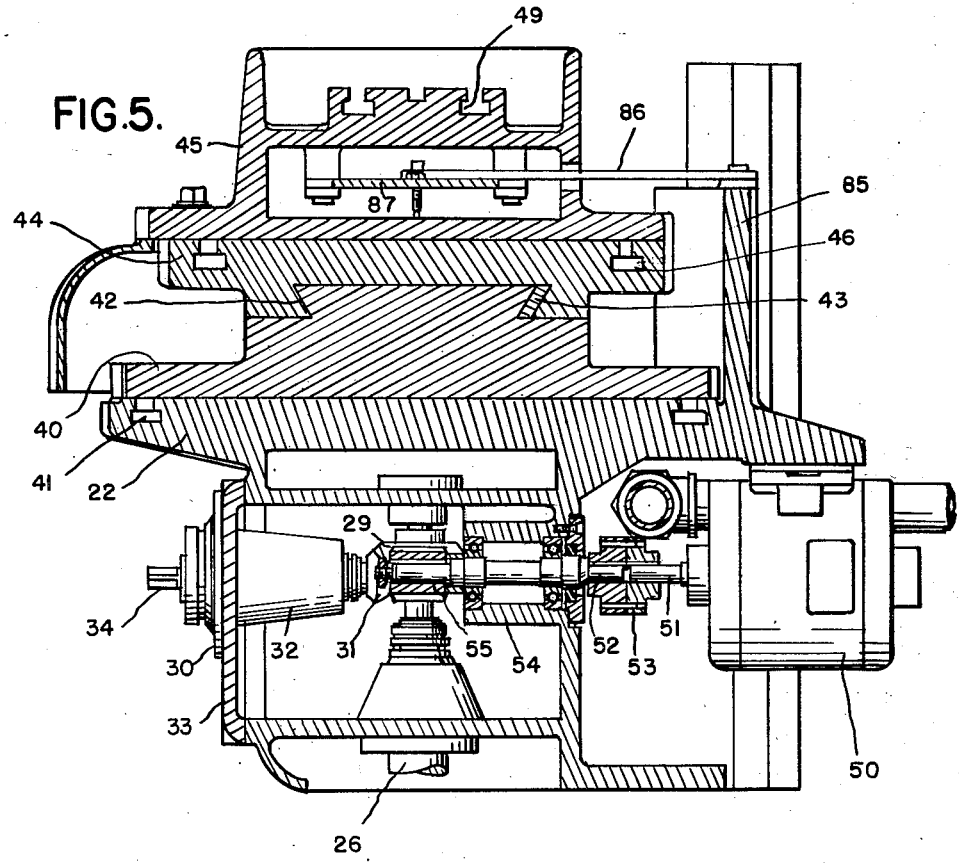
Figure 5 is a section on the line 5—5 of Figure 3.

Mounted on ways 20 formed in a plate 21 secured to the upright portion of the frame 10 is a knee 22. Means for effecting vertical adjustment of the knee, as best seen in Figure 5, comprises a vertically extending adjusting screw 26 which is mounted for rotation relative to the knee and at the same time locked against axial movement relative thereto by bearing means indicated generally at 27 (Figure 4). The upper end of the screw 26 is supported in bearings 28 and a bevel gear 29 is keyed thereto. Manual means indicated generally at 30 are provided for effecting rotation of the screw 26 and comprises a bevel gear 31 meshing with the bevel gear 29, the bevel gear 31 being carried by a shaft extending through bearing structure 32 and a closure plate 33 carried by the knee and terminating in a squared end indicated at 34 for cooperation with a suitably formed tool. It will be apparent that rotation of the shaft having the squared end 34 by a hand tool will effect rotation of the screw 26, and that this rotation relative to the fixed feed nut previously described will result in vertical adjustment of the knee 22.

Mounted on the knee 22 for adjustment about a vertical axis thereon is a first sub-table or carriage support 40 and means are provided for locking the sub-table 40 in adjusted position relative to the knee 22 which comprises a circular T slot 41 provided on the knee 22 and suitable locking bolts carried by the sub-table and having head portions received within the bottom of the T slots 41. The first sub-table 40 is provided at its upper surface with rectilinear ways 42 including a removable gib 43. A second sub-table 44 is shaped to cooperate with the ways 42 and gib 43 for rectilinear translation along the sub-table 40.

Mounted for adjustment about a vertical axis on the top of the second sub-table or carriage 44 is a work table 45 and means are provided for locking the work table 45 to the second sub-table 44 which take the form of a second circular T slot 46 formed in the upper surface of the second sub-table 44, suitable clamping bolts 46' being carried by the work table 45 for effecting locking of the work table in adjusted position.

The work table 45 is provided with rectilinear T slots 49 for adjustably receiving a headstock 47 and tailstock 48. The headstock 47 and the tailstock 48 comprises means for supporting a rotary work piece indicated at W in Figure 1 in proximity to the location of the tool T. It will be observed from an inspection of Figure 1 that in order to effect engagement between tool T and the work W as illustrated it is necessary to raise the knee by appropriate turning of the feed screw 26. It will also be apparent that in order to effect engagement between the tool and the work at crossed axes it is best to effect a desired rotation of the tool support 12 so as to bring the axis of the tool T into a desired crossed axial relationship with respect to the work without disturbing orientation of the work.

Referring now to Figures 4 and 5, means are provided for effecting relative traverse between the tool and work and more specifically for effecting translation of the work table 45. This means comprises a motor 50 mounted on the knee 22 for vertical adjustment therewith and having a drive shaft 51 connected to a second shaft 52 by a coupling 53. The shaft 52 is supported in bearings indicated generally at 54 and terminates in a worm 55 which in turn drives a worm gear 56 (Figure 4). The gear 56 is mounted on a shaft 57 having a toothed driving portion 58 connected to oil pumping means indicated generally at 59. Secured to the opposite end of the shaft 57 is a pinion 60 which drives a shaft 61 through an intermeshing gear 62. The shaft 61 carries a bevel gear 63 meshing with a second bevel gear 64 carried by a vertical shaft 65 to which is keyed or otherwise secured a gear 66. The gear 66 in turn meshes with a gear 67 keyed or otherwise secured to a shaft 68 at the upper end of which is keyed or otherwise secured a bevel gear 69. The bevel gear 69 meshes with a bevel gear 70 which is keyed to a feed screw 71 which is mounted for rotation and held against axial translation relative to the first sub-table 40 by bearings indicated at 75 engaging opposite sides of a supporting shoulder structure 76.

The second sub-table 44 has rigidly secured thereto in depending relation a feed nut 77 which threadedly engages the feed screw 71. Opposite ends of the feed screw 71 are provided with squared ends as indicated at 80 for suitable engagement by a hand tool for a purpose which will later appear.

From the foregoing description it will be apparent that rotation of the shaft 51 by the motor 50 results in rotation of the feed screw 71, and since this feed screw is held against axial movement, its rotation will result in a timed traverse of the second sub-table 44 along the ways 42 previously described.

The circular T slot 41 provided in the upper surface of the knee 22 is coaxial with the shaft 68 and accordingly rotation of the first sub-table 40 about this axis relative to the knee 22 may be effected without disturbing the train of gears interconnecting the motor 50 and the feed screw 71.

The circular T slot 46 formed in the upper surface of the second sub-table 44 has an axis parallel to an axis of the shaft 68 and which coincides with the axis of the shaft 68 when the sub-table 44 is in central position.

It is desired to change the direction of traverse of the work table 45 in a horizontal plane without disturbing its orientation in order that long work pieces may be accommodated by the machine. Thus for example in the event that a gear to be finished is formed integrally on a long shaft the shaft may be mounted between centers or mounted in a special support adapted to receive intermediate portion of the shaft without giving rise to a problem of interference between the extending portion of the shaft and fixed portions of the machine during the desired traverse. It is pointed out at this time that the traverse mechanism illustrated provides for the complete adjustment of the direction of traverse so that the work piece may be caused to move from its central position in any direction through the complete arc of 360°.

The gear 67 engages a gear 72 which through suitable gearing indicated generally at 73 actuates timing means 74 for effecting control of the motors. This particular timing means forms no part of the present invention and is not illustrated in detail but is adapted to effect reversal of the motors 14 and 50 after predetermined traverse of the work table so that the work table will be reversely traversed and at the same time reverse rotation will be imparted to the work piece and tool. It will be appreciated that this operation is desirable in the case of gear finishing. However, in the event that the operation being performed is another operation such as surface shaving the timing means may be set merely to halt the traverse of the work table or to reverse the traverse of the work table and to bring it back to its initial position.

It will be observed that adjustment of the sub-tables 40 and 44 as a unit about a vertical axis will result in the rotation therewith of the feed screw 71 and the machine is so designed that either one end or the other of the feed screw 71 is always in a position where it may be engaged by a suitable hand tool. This provides means for effecting a fine adjustment of the sub-tables relative to the machine, as will now be described. When the motor 50 is stopped, due to the fact that the drive therefrom includes a worm and worm gear, the gear train connecting the motor and the feed screw 71 is effectively locked against a rotation initiated from the feed screw end thereof. Accordingly, when the feed screw 71 is rotated by hand it will result in rotation of the sub-tables 40 and 44 as a unit, this adjustment being effected by the bevel gear 70 meshing with the bevel gear 69, which at this time is effectively locked against rotation. It is recognized of course that rotation of the feed screw 71 besides effecting the desired angular adjustment of the sub-tables 40 and 44 will also effect a very slight lateral displacement of the sub-table 44 with respect to the sub-table 40 due to the engagement between the feed screw 71 and the feed nut 77. This movement is, however, inconsiderable and presents no difficulties.

Figure 3:
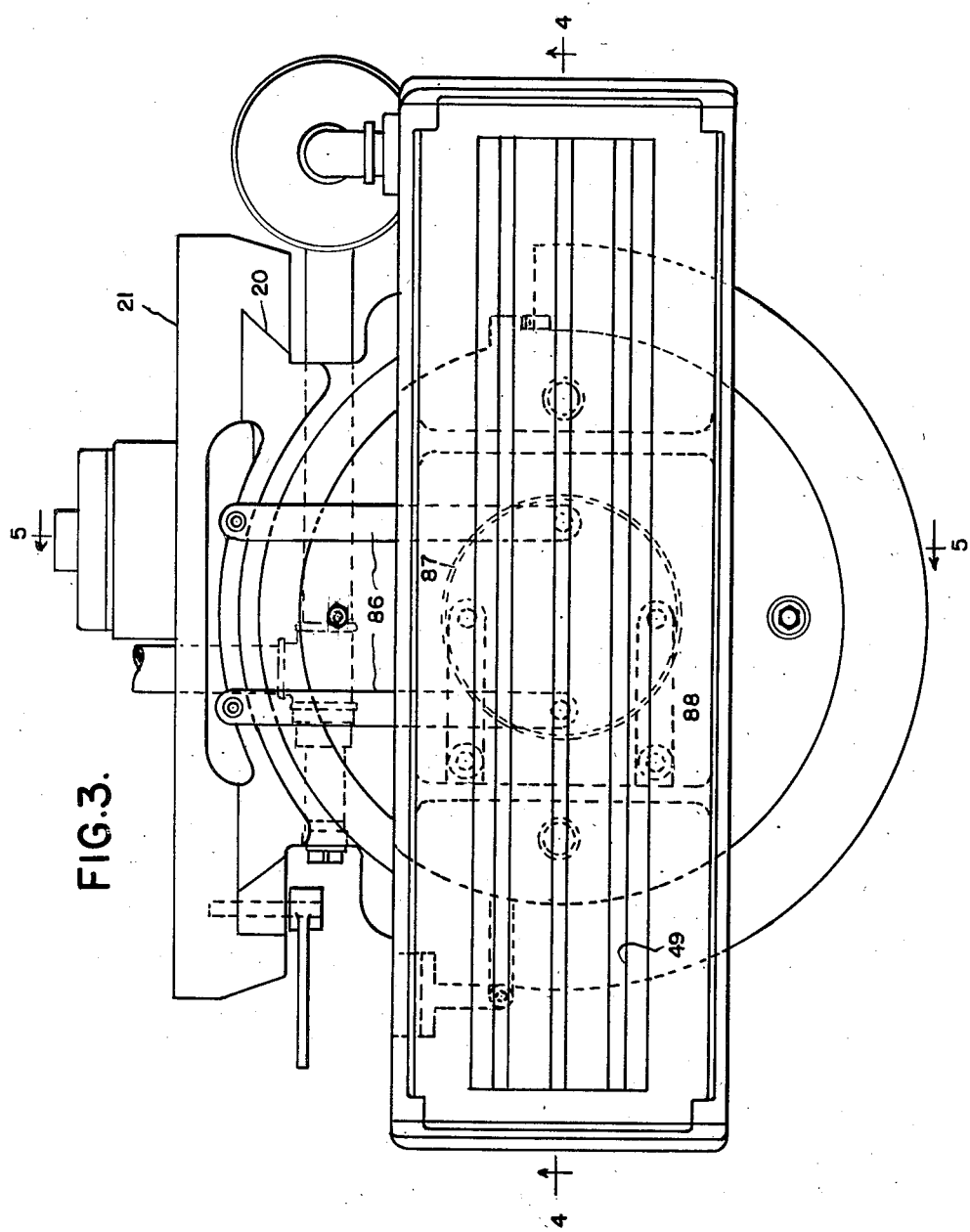
Figure 3 is a fragmentary plan view of the work supporting mechanism as indicated by the line 3—3 of Figure 2.

In order that the work table 45 will be maintained substantially in its oriented position linkage mechanism best illustrated in Figures 3, 4 and 5 is provided. As seen in these figures, the knee has formed thereon an upwardly extending plate 85 to which are secured a pair of parallel movable links 86 which at their opposite ends are parallel to said first axis, means for preventing angular movement of said traversing support relative to said frame during angular adjusting movement of said feeding means, and means for driving one of said spindles in rotation.

6. A machine as defined in claim 5, in which the means for preventing angular movement of the traversing support comprises parallel links extending between said frame and said traversing support.

7. A machine as defined in claim 5, in which the means for preventing angular movement of the traversing support comprises a plate mounted for free sliding movement in a plane perpendicular to the said first axis, a first set of parallel links connecting said plate to said frame, and a second set of parallel links connecting said plate to said traversing support.

8. A machine as defined in claim 7, in which the sets of parallel links are disposed generally at right angles when said traversing support is in an intermediate position.

9. A gear finishing machine comprising a frame having a reference axis, a pair of spindles adapted to support a gear and gear-like tool in mesh with their axes crossed, said spindles comprising a first rotary spindle perpendicular to and intersecting said axis, means mounting said spindle on said frame for adjustment about said reference axis, a second rotary spindle, table means supporting said second rotary spindle perpendicular to said reference axis for angular adjustment about an axis parallel to said reference axis and for traverse in any direction in a plane perpendicular to said reference axis with the axis of said second rotary spindle in any angular position of adjustment, said table means comprising a first sub-table, means supporting said first sub-table on said frame for angular adjustment about said reference axis, rectilinear ways on said first sub-table perpendicular to and intersecting said reference axis at the side of said first sub-table adjacent said first rotary spindle, a second sub-table on said first sub-table and movable on the ways thereon, a main table on said second sub-table at the side thereof adjacent said first spindle, means mounting said main table for angular adjustment on said second sub-table about an axis parallel to said reference axis, said axis being coincident with said reference axis when said second sub-table is intermediate the ends of said ways, and traverse drive means for effecting traverse of said second sub-table on its ways relative to said first sub-table in any position of angular adjustment, said traverse drive means comprising a feed nut and screw connecting said sub-tables and gearing for effecting relative rotation between said nut and screw including a gear having its axis coincident with said reference axis.

10. A machine as defined in claim 9 in which said first sub-table is angularly adjustable throughout 360 degrees.

KENNETH J. DAVIS.

REFERENCES CITED

The following references are of record in the file of this patent:

UNITED STATES PATENTS

| Number | Name | Date |
|---|---|---|
| 1,932,546 | Graves et al. | Oct. 31, 1933 |
| 1,983,090 | Kolsch | Dec. 4, 1934 |
| 2,270,422 | Drummond | Jan. 20, 1942 |
| 2,280,045 | Miller | Apr. 14, 1942 |

FOREIGN PATENTS

| Number | Country | Date |
|---|---|---|
| 480,247 | Great Britain | Feb. 14, 1938 |